United States Patent
Petersson et al.

(10) Patent No.: US 11,411,695 B2
(45) Date of Patent: Aug. 9, 2022

(54) TRANSMISSION OF REFERENCE SIGNALS FROM A TERMINAL DEVICE

(71) Applicant: Telefonaktiebolaget LM Ericsson (publ), Stockholm (SE)

(72) Inventors: Sven Petersson, Sävedalen (SE); Fredrik Athley, Kullavik (SE); Andreas Nilsson, Gothenburg (SE); Roy Timo, Järfälla (SE); Xinlin Zhang, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 518 days.

(21) Appl. No.: 16/472,048

(22) PCT Filed: Apr. 29, 2019

(86) PCT No.: PCT/EP2019/060942
§ 371 (c)(1),
(2) Date: Jun. 20, 2019

(87) PCT Pub. No.: WO2020/221422
PCT Pub. Date: Nov. 5, 2020

(65) Prior Publication Data
US 2021/0359805 A1 Nov. 18, 2021

(51) Int. Cl.
*H04L 5/00* (2006.01)
*H04W 72/04* (2009.01)

(52) U.S. Cl.
CPC ........... *H04L 5/0048* (2013.01); *H04W 72/04* (2013.01)

(58) Field of Classification Search
CPC .............................. H04L 5/0048; H04W 72/04
See application file for complete search history.

(56) References Cited

U.S. PATENT DOCUMENTS

| | | | |
|---|---|---|---|
| 2006/0270360 A1* | 11/2006 | Han | H04B 7/0639 455/69 |
| 2013/0107849 A1* | 5/2013 | Park | H04B 7/0647 370/329 |

(Continued)

FOREIGN PATENT DOCUMENTS

| | | |
|---|---|---|
| CN | 108111283 A | 6/2018 |
| WO | 2012053948 A1 | 4/2012 |

OTHER PUBLICATIONS

3GPP TS 38.211, V15.5.0 (Mar. 2019), 3rd Generation Partnership Project; Technical Specification Group Radio Access Network; NR; Physical channels and modulation (Release 15), Mar. 2019 (92 pages).

(Continued)

*Primary Examiner* — Duc C Ho
(74) *Attorney, Agent, or Firm* — Rothwell, Figg, Ernst & Manbeck, P.C.

(57) ABSTRACT

There is provided mechanisms for transmission of reference signals. A method is performed by a terminal device. The terminal device comprises at least two physical antenna ports. The method comprises obtaining channel information. The method comprises determining, for at least one given precoder in a codebook, an uplink reference signal to physical antenna port mapping based on the channel information. The method comprises transmitting uplink reference signals in the physical antenna ports according to the determined mapping.

21 Claims, 5 Drawing Sheets

(56) References Cited

U.S. PATENT DOCUMENTS

| | | | |
|---|---|---|---|
| 2015/0236773 A1* | 8/2015 | Kim | H04B 7/0452 |
| | | | 375/295 |
| 2015/0256239 A1* | 9/2015 | Yu | H04B 7/0632 |
| | | | 370/329 |
| 2016/0037550 A1* | 2/2016 | Barabell | H04W 72/046 |
| | | | 455/450 |
| 2016/0087701 A1 | 3/2016 | Wu et al. | |
| 2016/0183099 A1* | 6/2016 | Frenger | H04W 52/0206 |
| | | | 370/311 |
| 2018/0167252 A1 | 6/2018 | Wang et al. | |
| 2018/0294847 A1 | 10/2018 | Lee et al. | |
| 2018/0302129 A1* | 10/2018 | Athley | H04B 17/345 |
| 2018/0309490 A1 | 10/2018 | Rahman et al. | |
| 2019/0007112 A1 | 1/2019 | Faxér et al. | |

OTHER PUBLICATIONS

International Search Report and the Written Opinion of the International Searching Authority, issued in corresponding International Application No. PCT/EP2019/060942, dated Feb. 26, 2020, 16 pages.

Qualcomm Incorporated "Views on SRS" 3GPP TSG-RAN WG1 #87, Nov. 14-18, 2016, Reno, Nevada, R1-1612049, 4 pages.

* cited by examiner

TRANSMISSION OF REFERENCE SIGNALS FROM A TERMINAL DEVICE

CROSS REFERENCE TO RELATED APPLICATION(S)

This application is a 35 U.S.C. § 371 National Phase Entry Application from PCT/EP2019/060942, filed Apr. 29, 2019, designating the United States, the disclosure of which is incorporated herein in its entirety by reference.

TECHNICAL FIELD

Embodiments presented herein relate to a method, a terminal device, a computer program, and a computer program product for transmission of reference signals.

BACKGROUND

In communications networks, there may be a challenge to obtain good performance and capacity for a given communications protocol, its parameters and the physical environment in which the communications network is deployed.

For example, equipping a terminal device with two or more, or even multiple, transmit antennas (where each such antenna is connected to its own physical antenna port at the terminal device) might enable the uplink performance to be increased through higher spectral efficiency and/or improved link budget than allowed for only one single antenna.

Two uplink transmission schemes will be considered next; codebook based (CB) transmission and non-codebook based (NCB) transmission. CB transmission is a feedback based transmission scheme that can be used for frequency division duplex (FDD) and for terminal devices without transmitter-receiver reciprocity. NCB transmission is based on reciprocity and can be used in time division duplex (TDD) for UEs with transmitter-receiver reciprocity.

In CB transmission the terminal device first transmits one or two uplink reference signals, such as sounding reference signals (SRS, or SRS ports). The radio access network node serving the terminal device estimates the uplink radio propagation channel based on the received uplink reference signals, where each uplink reference signal is transmitted from a separate physical antenna port, and determines a suitable transmission rank and precoder for the coming uplink data transmission. In general terms, the number of rows of the precoder equals the number of physical antenna ports, and the number of columns of the precoders equals the number of layers. The precoder could be selected from a predetermined set of fixed precoders defined in the 3GPP specifications, a so-called codebook, see 3GPP TS 38.211 "NR; Physical channels and modulation", Version 15.50.0. The radio access network node then signals the transmission rank via a transmit rank indicator (TRI) and an index to the determined precoder in the codebook, a so-called transmit precoder matrix indicator (TPMI). The terminal device shall then use the precoder corresponding to the signaled TRI and TPMI in its upcoming uplink data transmission.

Depending on terminal device implementation, it may be possible to maintain the relative phase of the transmit chains of an antenna array (assuming for example one radio chain per antenna element). In this case, the terminal device is enabled to transmit the same modulation symbol over multiple transmit chains with individual gain and/or phase per transmit chain and in this way forming a beam over the corresponding antenna array. This transmission of a common modulation symbol or signal on multiple antenna elements with controlled phase is referred to as coherent transmission. The support for coherent uplink MIMO transmission in Release 10 of the Long Term Evolution (LTE) suite of telecommunication standards is indicated via a feature group indication for relative transmit phase continuity for uplink spatial multiplexing, wherein a terminal device indicates if it can adequately maintain the relative phase of transmit chains over time in order to support coherent transmission.

In other terminal device implementations, the relative phase of the transmit chains may not be well controlled, and coherent transmission may not be used. In such implementations, it may still be possible for the terminal device to transmit on one of the transmit chains at a time, or to transmit different modulation symbols on the transmit chains. In the latter case, the modulation symbols on each transmit chain may form a spatially multiplexed, or MIMO, layer. This class of transmission is referred to as non-coherent transmission.

In still other terminal device implementations, the relative phase of a subset of the transmit chains is well controlled, but not over all transmit chains. One possible example is described above with respect to multi-panel operation, where phase is well controlled among transmit chains within a panel, but phase between panels is not well controlled. This class of transmission is referred to as partially-coherent.

Figure 1:
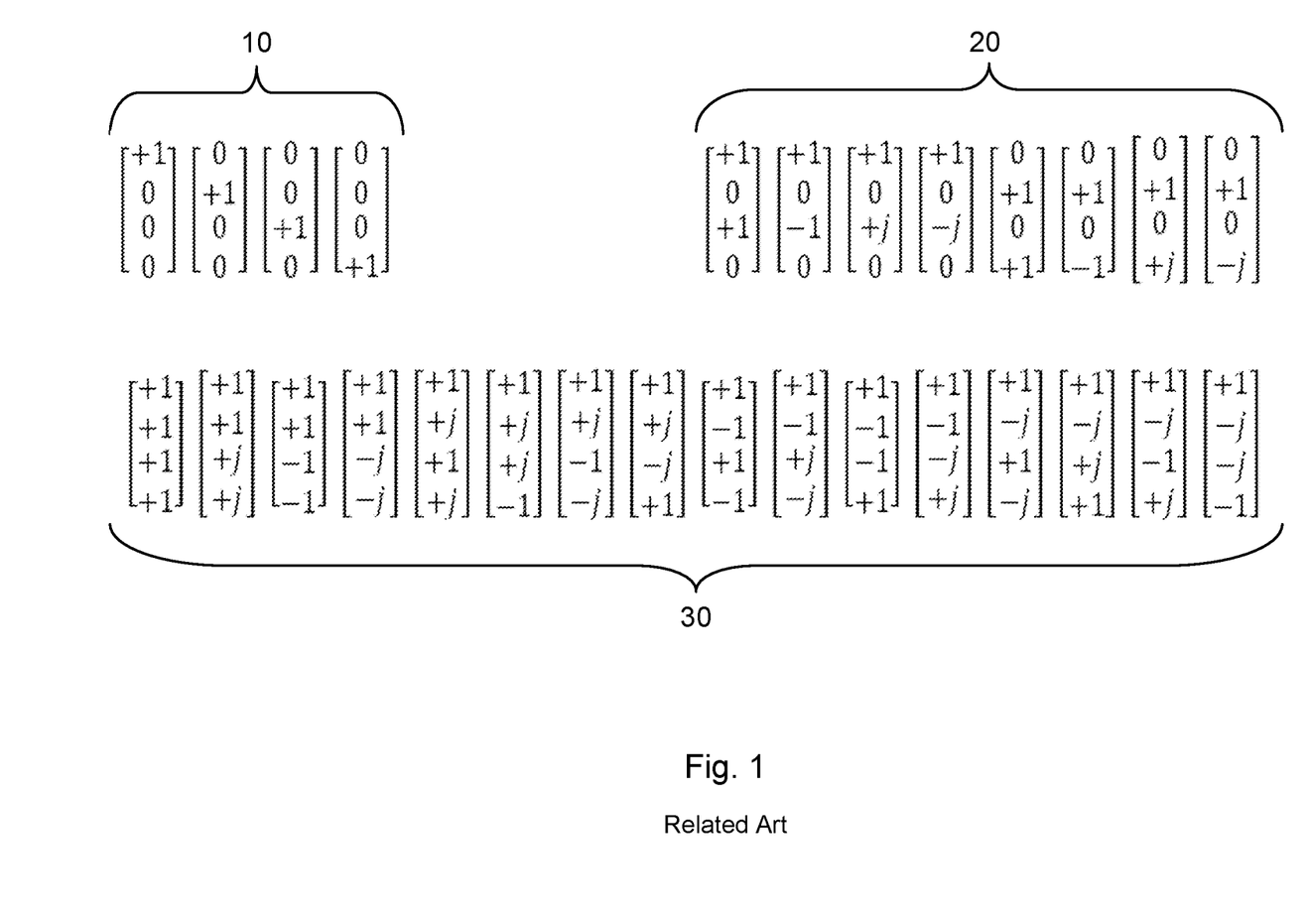
FIG. 1 schematically illustrates precoders.

All three of these variants of relative phase control have been agreed to be supported for transmission over the fifth generation (5G) New Radio (NR) air interface, and so terminal device capabilities have been defined for full coherence, partial coherence, and non-coherent transmission. Depending on coherence capability of the terminal device, it is possible to configure the terminal device with three different combinations of codebook subsets. FIG. 1 illustrates three different codebook subsets 10, 20, 30 for rank 1 precoders. Codebook subset 10 is referred to as non-coherent and only consists of antenna selection precoders. Codebook subset 20 is referred to as partial-coherent and only consists of antenna pair selection precoders. Codebook subset 30 is referred to as fully-coherent and only consists of full linear combining precoders. Depending on the terminal device coherence capability, the radio access network node can configure the terminal device with three different combinations of the codebook subsets. For non-coherent terminal devices, the radio access network node is expected to configure the terminal device with only the non-coherent codebook subset 10. For partially-coherent terminal devices, the radio access network node is expected to configure the terminal device with both the non-coherent and the partial-coherent codebook subsets 10, 20, and for fully-coherent terminal devices, the radio access network node is expected to configure the terminal device with all three codebook subsets 10, 20, 30.

How the uplink reference signals should be transmitted, for example which uplink reference signal resources to use, frequency allocation, time domain behavior (periodic, semi-persistent or aperiodic), etc., needs to be signaled to the terminal device from the radio access network node. One way to implement this is to define a number of uplink reference signal resource sets using higher layer signaling (such as radio resource control (RRC) signaling), where each uplink reference signal resource set contains a list of uplink reference signal resources. In some communication systems only one uplink reference signal resource set is defined, which might contain up to two uplink reference signal resources, where each uplink reference signal resource might consist of up to four ports (such as SRS ports). The transmission of the uplink reference signals is then triggered by letting the radio access network node signal a pointer to this uplink reference signals resource set, which implicitly indicates to the terminal device to transmit the uplink reference signal resources listed in that uplink reference signal resource set.

The codebooks for codebook based uplink transmission for the 5G NR air interface are specified in the aforementioned document 3GPP TS 38.211. A row in a precoding matrix corresponds to a particular SRS port and a column corresponds to a layer in the PUSCH transmission.

When applying the codebook to a terminal device with more than one physical antenna port, it must be decided in which physical antenna port a particular uplink reference signal (such as a SRS port) should be transmitted. For example, SRS port 1 could be transmitted in physical antenna port 1, SRS port 2 in physical antenna port 2, and so on. The same mapping is then used in the next upcoming uplink data transmission.

However, the 4-port codebook specified in the aforementioned document 3GPP TS 38.211 is incomplete with regards to how the four physical antenna ports at the terminal device are to be used for uplink data transmission. In particular, the 4-port codebook does not support all antenna port combinations, which, for example, can result in inefficient use of the antenna array and limited transmission power budget.

Hence, there is still a need for an improved codebook based uplink transmission.

SUMMARY

An object of embodiments herein is to provide efficient transmission of reference signals enabling improved codebook based uplink transmission.

According to a first aspect there is presented a method for transmission of reference signals. The method is performed by a terminal device. The terminal device comprises at least two physical antenna ports. The method comprises obtaining channel information. The method comprises determining, for at least one given precoder in a codebook, an uplink reference signal to physical antenna port mapping based on the channel information. The method comprises transmitting uplink reference signals in the physical antenna ports according to the determined mapping.

According to a second aspect there is presented a terminal device for transmission of reference signals. The terminal device comprises processing circuitry. The processing circuitry is configured to cause the terminal device to obtain channel information. The processing circuitry is configured to cause the terminal device to determine, for at least one given precoder in a codebook, an uplink reference signal to physical antenna port mapping based on the channel information. The processing circuitry is configured to cause the terminal device to transmit uplink reference signals in the physical antenna ports according to the determined mapping.

According to a third aspect there is presented a terminal device for transmission of reference signals. The terminal device comprises an obtain module configured to obtain channel information. The terminal device comprises a determine module configured to determine, for at least one given precoder in a codebook, an uplink reference signal to physical antenna port mapping based on the channel information. The terminal device comprises a transmit module configured to transmit uplink reference signals in the physical antenna ports according to the determined mapping.

According to a fourth aspect there is presented a computer program for transmission of reference signals, the computer program comprising computer program code which, when run on a terminal device, causes the terminal device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this provides efficient transmission of reference signals.

Advantageously this enables improved codebook based uplink transmission.

Advantageously this enables better usage of the physical antenna ports during codebook based uplink transmission, In turn, this can increase the uplink performance.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise.

The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
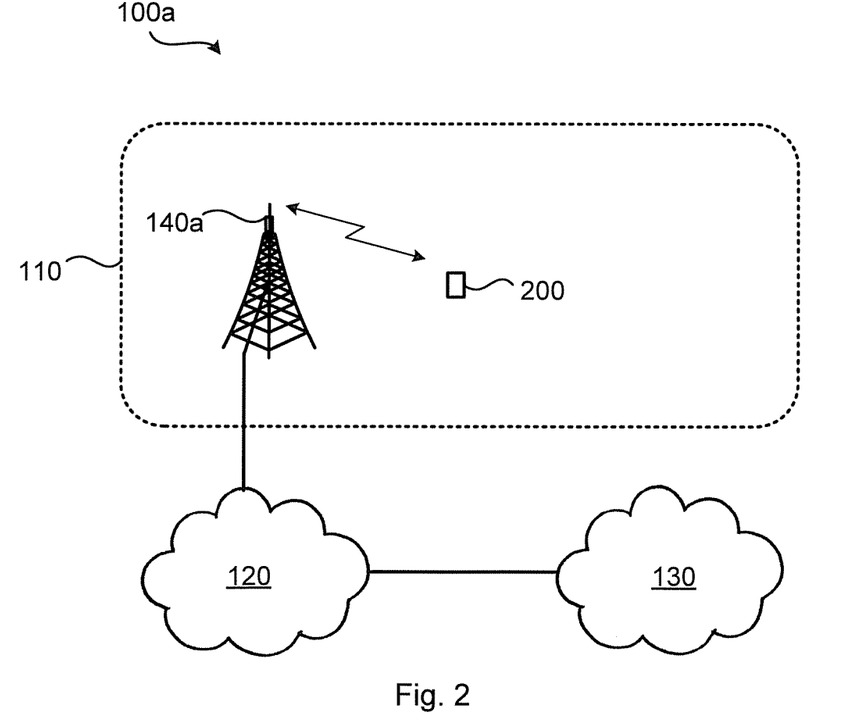
FIGS. 2 and 5 are schematic diagrams illustrating communication systems according to embodiments.

FIG. 2 is a schematic diagram illustrating a communication system 100a where embodiments presented herein can be applied. The communications system 100a comprises a radio access network node 140a configured to provide network access over one or more radio propagation channels to a terminal device 200 in a radio access network no. Non-limited examples of terminal devices 200 are portable wireless devices, mobile stations, mobile phones, handsets, wireless local loop phones, user equipment (UE), smartphones, laptop computers, tablet computers, network equipped sensors, network equipped vehicles, and Internet of Things (IoT) devices. In some embodiments the radio access network node 140a is part of, integrated with, or collocated with a radio base station, base transceiver station, node B, evolved node B, gNB, access point, or the like. The radio access network 110 is operatively connected to a core network 120. The core network 120 is in turn operatively connected to a packet data network 130, such as the Internet. The terminal device 200 is thereby, via the radio access network node 140a, enabled to access services of, and exchange data with, the service network 130.

Figure 3:
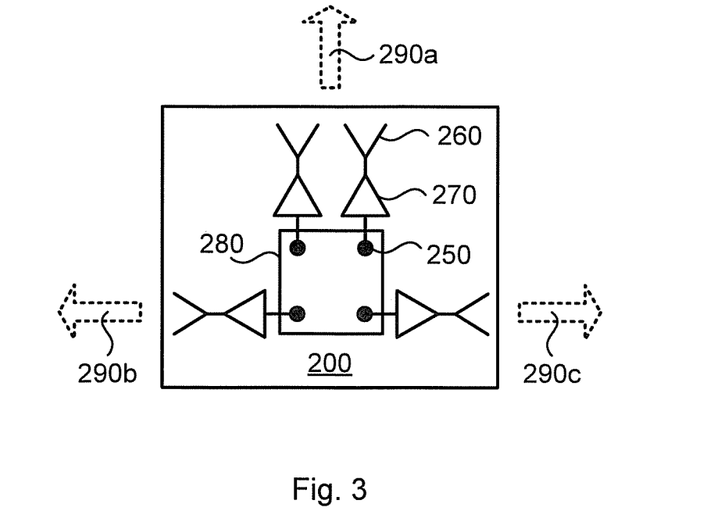
FIG. 3 schematically illustrates a terminal device according to an embodiment.

FIG. 3 schematically illustrates a terminal device 200 equipped with four physical antennas 260. As the skilled person understands, these are just examples and the terminal device 200 might be equipped with more (or less) physical antennas 260. Each physical antenna 260 has its own power amplifier (PA) 270. That is, each physical antenna port 250 is fed by its own PA 270. Each physical antenna 260 is connected to baseband circuitry 280 via its own physical antenna port 250. Thereby, when the terminal device 200 transmits reference signals, each of the reference signals comes from a respective one of the physical antenna ports 250. In some aspects the terminal device 200 has four or eight physical antenna ports 250 in total (depending on the number of physical antennas 260). Although each physical antenna 260 in FIG. 3 is illustrated as comprising only one single antenna element, as the skilled person understands, each physical antenna 260 might be implemented as an array of antenna elements. That is, each physical antenna port 250 could be operatively connected to only a single antenna element or an array of at least two antenna elements. In the illustrative example of FIG. 3, the antenna element or array of at least two antenna elements of at least two of the physical antenna ports 250 are arranged at the terminal device 200 to point in at least two mutually different pointing directions 290a, 290b, 290c. Two of the physical antennas 260 point in direction 290a, and a respective one of the physical antennas 260 points in directions 290b and 290c. Depending on the carrier frequencies the antenna element radiation patterns (hereinafter radiation pattern for short) given rise to by transmission (and reception) in the physical antenna ports 250 might be more or less directional. For lower frequencies the radiation patterns are typically fairly omni-directional, but when the carrier frequency increases the radiation pattern typically becomes more and more directional.

As noted above, there is a need for an improved codebook based uplink transmission.

In more detail, the usefulness of transmitting from a particular physical antenna port (or, combination of physical antenna ports) at any given time will depend on the channel conditions at that time and the antenna configuration at the terminal device 200. In general terms, the antenna configuration is defined by how the antenna elements are positioned on the terminal device 200 and their radiation patterns. The channel conditions will change over time and, therefore, the usefulness of each physical antenna port (or, combination of physical antenna ports) will also change over time.

Furthermore, it might be challenging to determine a priori the optimal uplink reference signal to physical antenna port mapping based on the antenna configuration. For example, it might be challenging to determine an antenna configuration for a handheld terminal device with precisely controlled gain and polarization properties and, therefore, these properties will vary from terminal device to terminal device.

For rank 1, the partially coherent TPMIs 4-11 of the precoding matrices specified in the aforementioned document 3GPP TS 38.211 implies usage of either physical antenna ports 1 and 3 or physical antenna ports 2 and 4, if the mapping between uplink reference signals and physical antenna ports is defined by the identity matrix is used. However, it might be better to instead use physical ports 1 and 2 or physical antenna ports 3 and 4, depending on the channel conditions. The rank 2 TPMIs 6-13 define precoding matrices of the partially coherent codebook subset. For these TPMIs, the first layer is transmitted over physical antenna ports 1 and 3 and the second layer is transmitted over physical antenna ports 2 and 4. For rank 3 there is a TPMI (TPMI 0) that does not use physical antenna port 4. If one of the other physical antenna ports (i.e., any of physical antenna ports 1-3) is blocked, it should be better to remap the blocked physical antenna port to SRS port 4 since SRS port 4 is not used anyway.

In summary, depending on the antenna configuration and the channel conditions, it could happen that none of the TPMIs in the 4-port codebook is optimal. There is thus potential for increased performance if a precoder not present in the 4-port codebook can be enabled, without introducing additional control overhead.

The embodiments disclosed herein therefore relate to mechanisms for transmission of reference signals. In order to obtain such mechanisms there is provided a terminal device 200, a method performed by the terminal device 200, a computer program product comprising code, for example in the form of a computer program, that when run on a terminal device 200, causes the terminal device 200 to perform the method.

Figure 4:
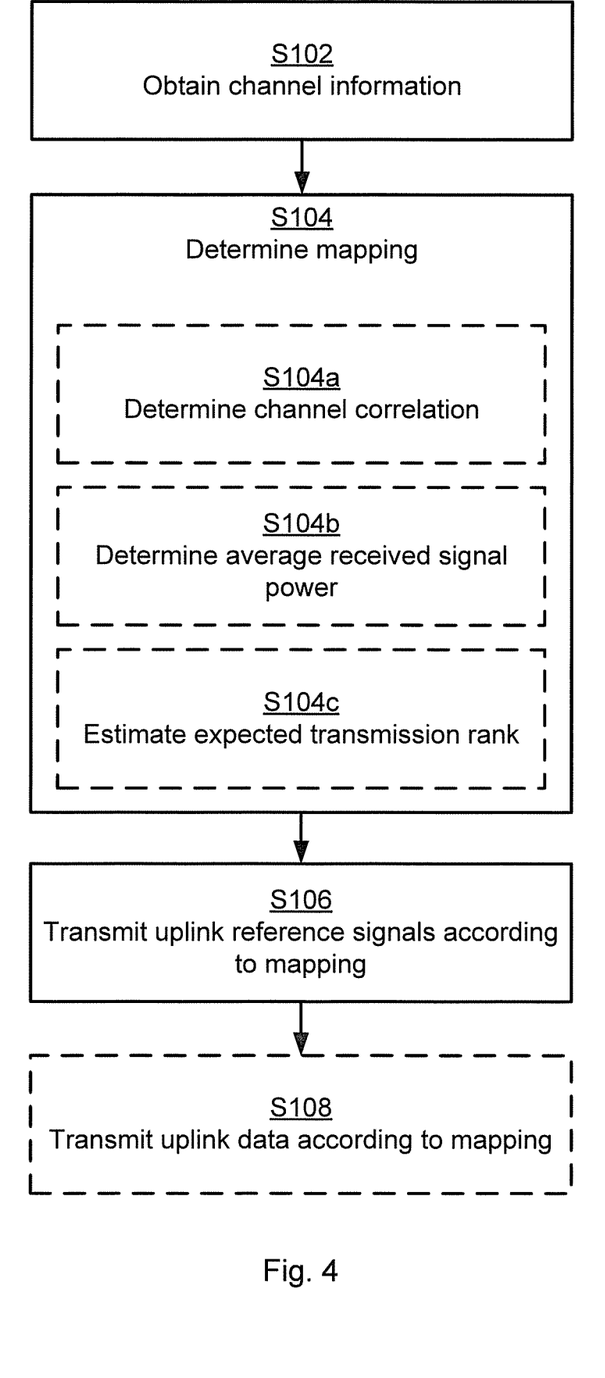
FIG. 4 is a flowchart of methods according to embodiments.

FIG. 4 is a flowchart illustrating embodiments of methods for transmission of reference signals. The methods are performed by the terminal device 200. The terminal device 200 comprises at least two physical antenna ports 250. The methods are advantageously provided as computer programs 820.

According to the herein disclosed embodiments precoders missing from the aforementioned document 3GPP TS 38.211 can be realized by the terminal device 200 being configured to dynamically change/control/configure its uplink reference signal (which might define an SRS port) to physical antenna port mapping.

The terminal device 200 is configured to determine an uplink reference signal to physical antenna port mapping based on channel information. Thus, the terminal device 200 is configured to perform S102 and S104:

S102: The terminal device 200 obtains channel information.

Different examples of channel information will be disclosed below.

S104: The terminal device 200 determines, for at least one given precoder in a codebook, the uplink reference signal to physical antenna port mapping based on the channel information.

In this respect, the terminal device 200 might thus determine the mapping based on two or more precoders. Different ways in which the mapping might be determined based on the channel information will be disclosed below. The determined mapping is then used for transmission of uplink reference signals. Thus, the terminal device 200 is configured to perform S106:

S106: The terminal device 200 transmits uplink reference signals in the physical antenna ports 250 according to the determined mapping.

Advantageously, this enables an adaptive mapping of SRS ports (as given by the uplink reference signals) to physical antenna ports 250 in the terminal device for codebook based uplink precoding based on measurements of channel conditions, as defined by the obtained channel information. For example, if the terminal device 200 determines that a physical antenna port is weak (e.g., by being blocked), then the terminal device 200 might dynamically configure its mapping to avoid using this physical antenna port during upcoming uplink data transmission, i.e., at least during the next-most occurring uplink data transmission.

Embodiments relating to further details of transmission of reference signals as performed by the terminal device 200 will now be disclosed.

There may be different ways to determine the uplink reference signal to physical antenna port mapping (hereinafter denoted mapping). Different embodiments relating thereto will now be described in turn.

In some aspects the terminal device 200 measures on downlink reference signals. That is, according to an embodiment, the channel information obtained from measurements on downlink reference signals. Non-limiting examples of downlink reference signals are channel state information reference signals (CSI-RSs), synchronization signal blocks (SSBs), etc.

In some aspects the terminal device 200 measures the channel correlation between all physical antenna port pairs in order to determine which antenna ports that should be used for the same layer. In particular, according to an embodiment, the channel information pertains to channel correlation or average received signal power. The number of layers is deduced from the channel correlation and the received power. Further, according to an embodiment, the at least one precoder defines transmission on at least one spatial layer, and the mapping is determined to select which at least one spatial layer to be transmitted on which physical antenna port 250.

Since low correlation is advantageous for spatial multiplexing and high correlation is advantageous for beamforming, physical antenna ports 250 with low correlation might be mapped to reference signal ports used for transmitting different layers and physical antenna ports 250 with high correlation might be mapped to reference signal ports for the same layer. In particular, according to an embodiment, the terminal device 200 is configured to perform (optional) step S104a as part of determining the mapping in S104:

S104a: The terminal device 200 determines channel correlation between all pairs of the physical antenna ports 250. Those pairs of the physical antenna ports 250 having highest channel correlation are then mapped to the same spatial layer in the precoder. As an example, for TPMI 6-13 in Table 6.3.1.5-5 of aforementioned document 3GPP TS 38.211, SRS ports 1 and 3 should be mapped to one antenna port pair with high correlation and SRS ports 2 and 4 should be mapped to another antenna port pair with high correlation. Alternatively, the mapping might be performed such that the mutual correlation between the physical antenna ports corresponding to SRS ports 1 and 3 and SRS ports 2 and 4 becomes as low as possible.

In some aspects there is at least one layer where the coefficients are zero. In particular, according to an embodiment, at least one row but less than all rows in each of the at least one precoder consists of all zero-valued coefficients. At least one, but not all, row(s) of the precoder contains all-zeros (i.e., where all coefficients have the value zero). This row with all-zeros should not be mapped to the physical antenna port with the highest received power.

In some aspects the mapping is determined based on pairing physical antenna ports 250 which have highest average received signal power. In particular, according to an embodiment, the terminal device 200 is configured to perform (optional) step S104b as part of determining the mapping in S104:

S104b: The terminal device 200 determines average received signal power for all pairs of the physical antenna ports 250. Those pairs of the physical antenna ports 250 having highest average received signal power are then mapped to spatial layers having non-all zero-valued coefficients in the at least one precoder.

According to an example, assuming that the terminal device 200 is equipped with four physical antenna ports, if two physical antenna ports receive significantly higher power than the other two physical antenna ports the terminal device 200 maps SRS port 1 and 3 or SRS ports 2 and 4 to the two physical antenna ports in which significantly higher power is received. This is because, according to aforementioned document 3GPP TS 38.211, for the rank 1 precoders in the codebook that use two SRS ports, one layer is mapped either to SRS ports 1 and 3 or to SRS ports 2 and 4. For rank 2, the mapping does not matter if one SRS port per layer is used since there are no missing precoders for that case.

In some aspects the mapping is determined based on an estimate of expected transmission rank in upcoming uplink data transmission. In particular, according to an embodiment, the terminal device 200 is configured to perform (optional) step S104c as part of determining the mapping in S104:

S104c: The terminal device 200 estimates expected transmission rank for upcoming uplink data transmission from the channel correlation or average received signal power. The mapping is then based on the expected transmission rank.

Further, the expected transmission rank could also be estimated based on statistics of previous uplink transmissions. For example, if transmission of a certain rank has been used for the latest most one or more uplink transmissions, then it could be expected that this would also be the expected transmission rank for the upcoming uplink data transmission.

According to an example, the terminal device 200 might thus estimate the expected transmission rank in coming PUSCH transmission. This can be achieved by the terminal device 200 analyzing received signal strength and channel correlation. If the received signal strength is high and channel correlation is low, a high transmission rank (such as rank 3 or 4) is expected, and otherwise a low transmission rank (such as rank 1 or 2) is expected. This analysis does not require channel reciprocity. If reciprocity holds, the terminal device 200 might perform a more detailed analysis and calculate expected throughput for each TPMI in the codebook based on an estimated channel matrix and then estimate the transmission rank as the one giving the highest throughput. The terminal device 200 might then use the estimated rank to optimize the mapping for this rank. For example, if rank 2 is estimated as the most likely transmission rank for the upcoming uplink data transmissions, the mapping might be optimized for the rank 2 precoders according to the embodiment involving above defined S104a.

In some aspects the mapping is determined to avoid using a weak physical antenna port during upcoming uplink data transmission. In particular, according to an embodiment, those pairs of the physical antenna ports 250 having lowest average received signal power are mapped to spatial layers having all zero-valued coefficients in the at least one precoder. That is, according to an example, if one physical antenna port 250 has been detected as being blocked, e.g., by measuring low received power, and rank 3 PUSCH transmission is anticipated, SRS port 4 is mapped to the blocked antenna port. This is because the precoding matrix of TPMI 0 for rank 3 does not use SRS port 4, see Table 6.3.1.5.4-6 in the aforementioned document 3GPP TS 38.211.

In some aspects, the mapping is frequency selective such that different mappings are applied in different frequency subbands. In particular, according to an embodiment, the terminal device 200 is configured to operate in at least two frequency bands, and the mapping is frequency selective such that different mappings are applied in the at least two frequency bands.

In some aspects, uplink data transmission from the terminal device 200 following the transmission of the reference signals will utilize the determined mapping. Particularly, according to an embodiment, the terminal device 200 is configured to perform (optional) step S108:

S108: The terminal device 200 transmits uplink data in the physical antenna ports (250) using one of the at least one given codebook based precoder as applied according to the determined mapping.

There could be different examples of uplink data. In some examples the uplink data is transmitted on a physical uplink shared channel (PUSCH). A terminal device 200 might thus transmit PUSCH using a codebook based precoder as applied according to the determined mapping.

There could be different examples of uplink reference signals. According to an example, the uplink reference signals are sounding reference signals (SRS). In some aspects the uplink reference signals are transmitted over the 5G NR air interface.

The herein disclosed embodiments could be applied to both time division duplex (TDD) systems with channel reciprocity and frequency division duplex (FDD) systems without channel reciprocity. For FDD systems, the terminal device 200 might be configured to determine that a physical antenna port is blocked using, for example, wideband statistics from downlink reference signals (so as to avoid fast-fading issues with different carriers). Blockage of a physical antenna port might also be detected by other means, e.g., impedance/reflection measurements, proximity sensors, etc.

The herein disclosed embodiments could be applied when it is challenging to determine the best mapping a priori based on properties of the antennas (such as the antenna configuration), which is often the case since it might be challenging to design antennas for a handheld terminal device with precisely controlled gain and polarization properties. Since the herein disclosed embodiments are based on channel conditions, the mapping does not rely on any assumptions made on the antenna properties.

Figure 5:
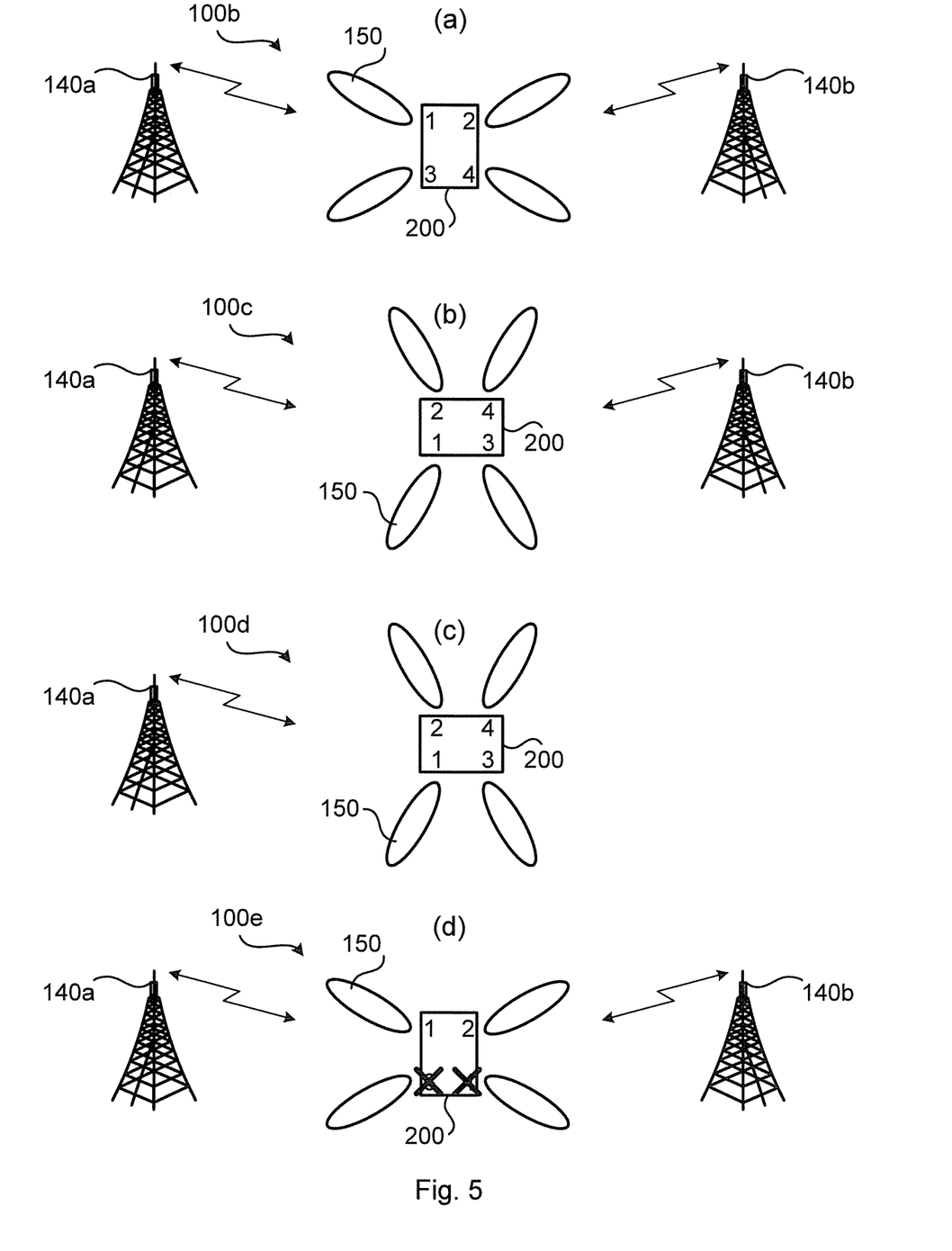

FIG. 5 at (a), (b), (c), and (d) gives four examples of communication systems 100b, 100C, 100d, woe where a terminal device 200 performs uplink reference signal to physical antenna port mapping in accordance with the herein disclosed embodiments. The examples are simplifications in order to emphasize the herein proposed inventive concept more clearly. In reality, the antenna radiation patterns and polarization states of the terminal device 200 are more irregular and random in nature and the radio propagation channel might be characterized by clusters of different radio signal strengths. However, since the proposed inventive concept is based on obtaining channel information and not on a priori assumptions thereof, the examples of FIG. 5 are valid also under more realistic assumptions. The terminal device comprises four physical antenna ports, identified at 1, 2, 3, and 4. One schematic radiation pattern 150 is illustrated at each physical antenna port. Each uplink reference signal is represented by an SRS port.

In all examples it is assumed that the precoding matrix given by any of TPMI 4, 5, 6, or 7 of Table 6.3.1.5-3 in the aforementioned document 3GPP TS 38.211 is to be used by the terminal device 200 during uplink transmission.

In FIG. 5(a), the terminal device 200 is located between two radio access network nodes 140a, 140b where the radiation patterns for physical antenna ports 1 and 3 have strong gain towards radio access network node 140a and the radiation patterns for physical antenna ports 2 and 4 have high gain towards radio access network node mob. In this case, SRS ports 1 and 3 should be mapped to physical antenna ports 1 and 3 and SRS ports 2 and 4 should be mapped to physical antenna ports 2 and 4, according to the previous discussion.

In FIG. 5(b), the terminal device 200 has been rotated 90 degrees in relation to FIG. 5(b) so that physical antenna ports 1 and 2 now have high gain towards radio access network node 140a whereas physical antenna ports 3 and 4 have high gain towards radio access network node mob. In this case, SRS ports 1 and 3 should be mapped to physical antenna ports 1 and 2 and SRS ports 2 and 4 should be mapped to antenna ports 3 and 4.

In FIG. 5(c), there is only one radio access network node 140a towards which antennas port 1 and 2 have high gain. In this case, SRS ports 1 and 3 should be mapped to physical antenna ports 1 and 2 and SRS ports 2 and 4 should be mapped to physical antenna ports 3 and 4.

In FIG. 5(d), physical antenna ports 3 and 4 are blocked so that these physical antenna ports receive with very low power. In this case, SRS ports 1 and 3 should be mapped to physical antenna ports 1 and 2 and SRS port 2 and 4 should be mapped to physical antenna ports 3 and 4.

As the skilled person, although some of the above examples have been given for a terminal device 200 with four physical antenna ports and reference therefore has been made to the 4-port codebooks, the herein disclosed principles apply also to other number of physical antenna ports and also other codebooks and precoding matrices than those specified in the aforementioned document 3GPP TS 38.211.

Figure 6:
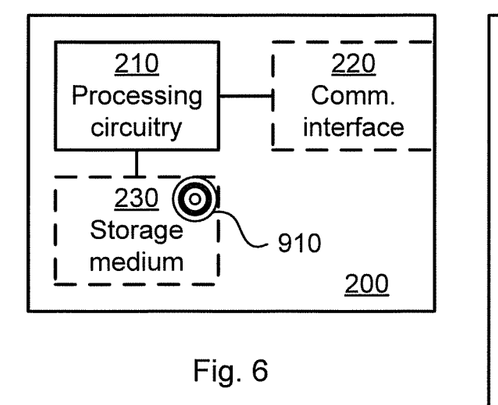
FIG. 6 is a schematic diagram showing functional units of a terminal device according to an embodiment.

FIG. 6 schematically illustrates, in terms of a number of functional units, the components of a terminal device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200 to perform a set of operations, or steps, as disclosed above. For example, the storage medium 230 may store the set of operations, and the processing circuitry 210 may be configured to retrieve the set of operations from the storage medium 230 to cause the terminal device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The terminal device 200 may further comprise a communications interface 220 at least configured for communications with other entities, nodes, functions, and devices of the communication system 100. As such the communications interface 220 may comprise one or more transmitters and receivers, comprising analogue and digital components. The processing circuitry 210 controls the general operation of the terminal device 200 e.g. by sending data and control signals to the communications interface 220 and the storage medium 230, by receiving data and reports from the communications interface 220, and by retrieving data and instructions from the storage medium 230. Other components, as well as the related functionality, of the terminal device 200 are omitted in order not to obscure the concepts presented herein.

Figure 7:
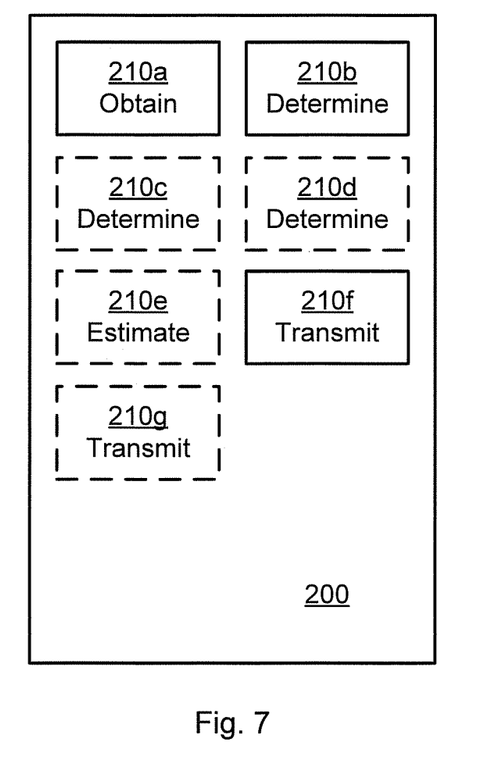
FIG. 7 is a schematic diagram showing functional modules of a terminal device according to an embodiment.

FIG. 7 schematically illustrates, in terms of a number of functional modules, the components of a terminal device 200 according to an embodiment. The terminal device 200 of FIG. 7 comprises a number of functional modules; an obtain module 210a configured to perform step S102, a determine module 210b configured to perform step S104, and a transmit module 210f configured to perform step S106. The terminal device 200 of FIG. 7 may further comprise a number of optional functional modules, such as any of a determine module 210c configured to perform step S104a, a determine module 21od configured to perform step S104b, an estimate module 210e configured to perform step S104c, and a transmit module 210g configured to perform step S108.

In general terms, each functional module 210a-230g may in one embodiment be implemented only in hardware and in another embodiment with the help of software, i.e., the latter embodiment having computer program instructions stored on the storage medium 230 which when run on the processing circuitry makes the terminal device 200 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210g may be implemented by the processing circuitry 210, possibly in cooperation with the communications interface 220 and/or the storage medium 230. The processing circuitry 210 may thus be configured to from the storage medium 230 fetch instructions as provided by a functional module 210a-210g and to execute these instructions, thereby performing any steps as disclosed herein.

Examples of terminal devices 200 have been given above.

Figure 8:
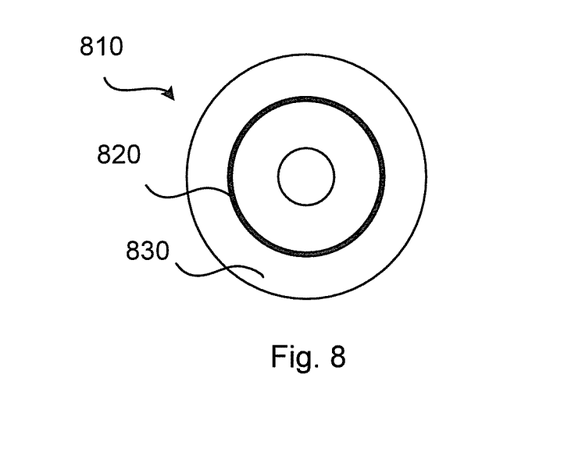
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transmission of reference signals, the method being performed by a terminal device, the terminal device comprising at least two physical antenna ports, the method comprising:
obtaining channel information;
based on the obtained channel information, determining, for at least one given precoder in a codebook, a mapping between an uplink reference signal and a physical antenna port; and
transmitting an uplink reference signal using one or more of said at least two physical antenna ports according to the determined mapping.

2. The method according to claim 1, wherein determining the mapping based on the obtained channel information comprises determining the mapping based on channel correlation or average received signal power.

3. The method according to claim 2, wherein determining the mapping comprises:
estimating expected transmission rank for upcoming uplink data transmission from the channel correlation or average received signal power, and wherein the mapping is based on the expected transmission rank.

4. The method according to claim 1, wherein
the at least one precoder defines transmission of at least one spatial layer, and
the mapping is determined to select one or more of said at least two physical antenna ports to use for transmitting said at least one spatial layer.

5. The method according to claim 4, wherein
determining the mapping comprises determining channel correlation of each pair of physical antenna ports included in said at least two physical antenna ports, and
a pair of physical antenna ports that is included in said at least two physical antenna ports and that has highest channel correlation is mapped to the same spatial layer in the precoder.

6. The method according to claim 5, wherein
determining the mapping comprises determining average received signal power of each pair of physical antenna ports included in said at least two physical antenna ports, and
a pair of physical antenna ports that is included in said at least two physical antenna ports and that has the highest average received signal power is mapped to at least one spatial layer having non-all zero-valued coefficients in the at least one precoder.

7. The method according to claim 6, wherein a pair of physical antenna ports that is included in said at least two physical antenna ports and that has the lowest average received signal power is mapped to at least one spatial layer having all zero-valued coefficients in the at least one precoder.

8. The method according to claim 4, wherein at least one row but less than all rows in each of the at least one precoder consists of all zero-valued coefficients.

9. The method according to claim 1, wherein the channel information is obtained from measurements on downlink reference signals.

10. The method according to claim 1, wherein the terminal device is configured to operate in at least two frequency bands, and wherein the mapping is frequency selective such that different mappings are applied in the at least two frequency bands.

11. The method according to claim 1, wherein each of the at least two physical antenna ports is fed by its own power amplifier.

12. The method according to claim 1, wherein each of the at least two physical antenna ports is operatively connected to only a single antenna element or an array of at least two antenna elements.

13. The method according to claim 12, wherein the antenna element or array of at least two antenna elements of at least two of the physical antenna ports are arranged at the terminal device to point in at least two mutually different pointing directions.

14. The method according to claim 1, wherein the uplink reference signals are sounding reference signals, SRS.

15. The method according to claim 14, wherein each uplink reference signal defines an SRS port.

16. The method according to claim 1, further comprising:
transmitting uplink data in the at least two physical antenna ports using one of the at least one given codebook based precoder as applied according to the determined mapping.

17. The method according to claim 16, wherein the uplink data is transmitted on a physical uplink shared channel, PUSCH.

18. The method according to claim 1, wherein the uplink reference signals are transmitted over the 5G New Radio, NR, air interface.

19. A terminal device for transmission of reference signals, the terminal device comprising at least two physical antenna ports and processing circuitry, the processing circuitry being configured to cause the terminal device to:
obtain channel information;
based on the obtained channel information, determine, for at least one given precoder in a codebook, a mapping between an uplink reference signal and a physical antenna port; and
transmit an uplink reference signal using one or more of said at least two physical antenna ports according to the determined mapping.

20. A terminal device for transmission of reference signals, the terminal device comprising:
at least two physical antenna ports;
an obtain module configured to obtain channel information;
a determine module configured to determine, for at least one given precoder in a codebook, a mapping between an uplink reference signal and a physical antenna port based on the obtained channel information; and
a transmit module configured to transmit an uplink reference signal using one or more of said at least two physical antenna ports according to the determined mapping.

21. A computer program product comprising a non-transitory computer readable medium storing a computer program comprising instructions which, when run on processing circuitry of a terminal device comprising at least two physical antenna ports causes the terminal device to:
obtain channel information;
based on the obtained channel information, determine, for at least one given precoder in a codebook, a mapping between an uplink reference signal and a physical antenna port; and
transmit an uplink reference signal using one or more of said at least two physical antenna ports according to the determined mapping.

* * * * *

UNITED STATES PATENT AND TRADEMARK OFFICE
CERTIFICATE OF CORRECTION

| | |
|---|---|
| PATENT NO. | : 11,411,695 B2 |
| APPLICATION NO. | : 16/472048 |
| DATED | : August 9, 2022 |
| INVENTOR(S) | : Petersson et al. |

It is certified that error appears in the above-identified patent and that said Letters Patent is hereby corrected as shown below:

In the Specification

In Column 1, Line 53, delete "15.50.0." and insert -- 15.5.0. --, therefor.

In the Claims

In Column 13, Line 17, in Claim 8, delete "each of the" and insert -- the --, therefor.

Signed and Sealed this
Fourth Day of April, 2023

*Katherine Kelly Vidal*

Katherine Kelly Vidal
*Director of the United States Patent and Trademark Office*